United States Patent [19] [11] 4,279,513
Tucker [45] Jul. 21, 1981

[54] OPTICAL INSPECTION SYSTEM FOR LARGE PARTS AND FOR MULTIPLE MEASUREMENTS

[75] Inventor: Billy J. Tucker, Skillman, N.J.

[73] Assignee: Sangamo Weston, Inc., Atlanta, Ga.

[21] Appl. No.: 25,827

[22] Filed: Apr. 2, 1979

[51] Int. Cl.³ .................... G01B 11/02; G01B 11/00
[52] U.S. Cl. ................................. 356/387; 356/394; 250/227
[58] Field of Search ............... 356/394, 376, 392, 393, 356/380, 372, 375, 384, 387, 385, 388; 358/96, 107; 250/227, 560; 350/96.25

[56] References Cited

U.S. PATENT DOCUMENTS

| | | |
|---|---|---|
| 1,997,417 | 4/1935 | Hand . |
| 2,484,103 | 10/1949 | Lewis . |
| 2,674,917 | 4/1954 | Summerhayes, Jr. ............... 250/560 |
| 2,759,602 | 8/1956 | Baigent ................................. 250/227 |
| 3,217,589 | 11/1965 | Chitayat ............................ 350/96.25 |
| 3,265,892 | 8/1966 | Sheldon .............................. 250/227 |
| 3,311,749 | 3/1967 | Briggs ................................ 250/227 |
| 3,365,699 | 1/1968 | Foster ................................. 250/227 |
| 3,437,022 | 4/1969 | Hamonds, Jr. . |
| 3,529,169 | 9/1970 | Heaney et al. ..................... 356/394 |
| 3,694,658 | 9/1972 | Watson et al. ..................... 250/560 |
| 3,724,958 | 4/1973 | Callan ................................. 250/560 |
| 3,761,723 | 9/1973 | De Cock ............................. 250/560 |
| 3,902,811 | 9/1975 | Altman et al. ..................... 356/394 |
| 3,992,107 | 11/1976 | Loy ...................................... 250/560 |
| 4,002,919 | 1/1977 | Linard ................................. 250/560 |
| 4,041,321 | 8/1977 | Linard ................................. 250/560 |

FOREIGN PATENT DOCUMENTS 2615622 10/1977 Fed. Rep. of Germany ........... 356/394
1285887 8/1972 United Kingdom ..................... 356/384

OTHER PUBLICATIONS

Echelmeier, "Edge and Width Evaluation," IBM Tech. Disc. Bull., vol. 16, No. 3, Aug. 1973, p. 975.

Primary Examiner—Davis L. Willis
Assistant Examiner—Carolyn E. Fields
Attorney, Agent, or Firm—J. J. Kaliko; Mikio Ishimaru; Dale V. Gaudier

[57] ABSTRACT

An optical-electronic measurement system wherein only the images of workpiece edges from which measurements are to be taken are coupled to identifiable locations on the photocathode of a processor-controlled scanner by a plurality of flexible fiber optic bundles whose object ends are placed about an inspection field so that each such edge is within the field of view of a respective bundle. Pairs of such identifiable locations are correlated to the measurements to be taken. A workpiece of known size is placed in the inspection field and the scanner photocathode is electronically scanned to determine the positions of the edge images relative to scan origins. The processor adjusts functions to relate the edge positions correctly to the known dimensions. The same measurements of workpieces of unknown dimensions are then taken by the calibrated system using the adjusted functions.

14 Claims, 11 Drawing Figures

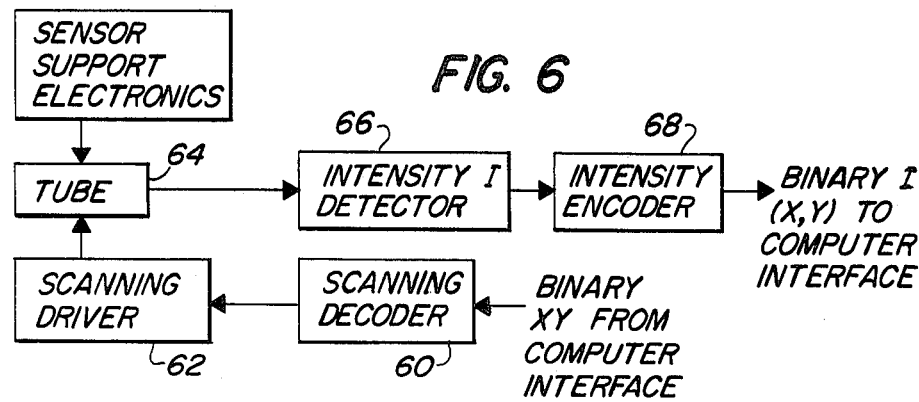
FIG. 6
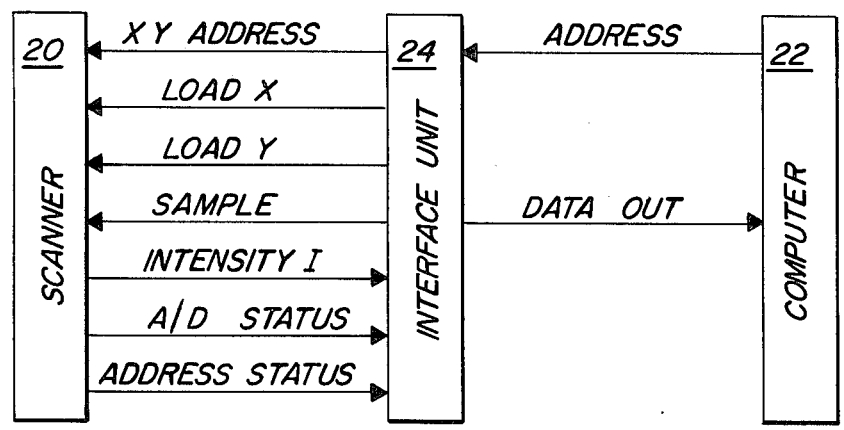
FIG. 7
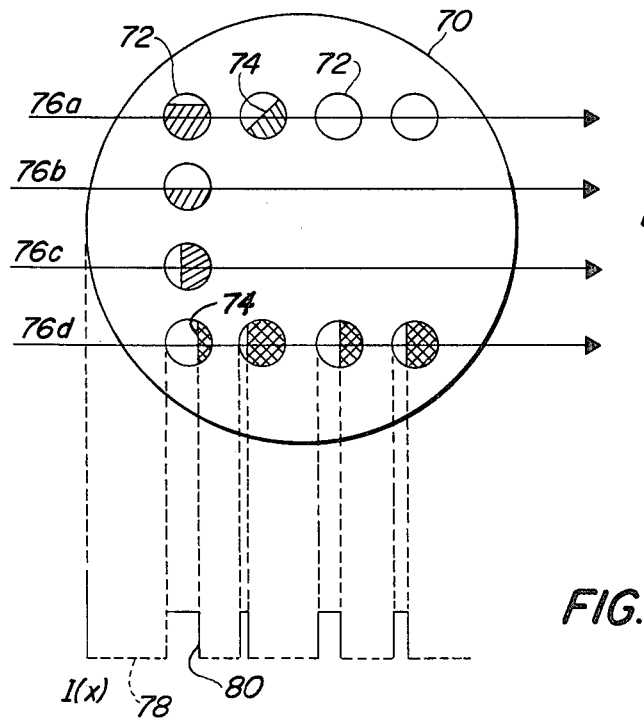
FIG. 8a
FIG. 8b

OPTICAL INSPECTION SYSTEM FOR LARGE PARTS AND FOR MULTIPLE MEASUREMENTS

BACKGROUND OF THE INVENTION

The present invention relates to measurement systems and, more particularly, to optical measurement or inspection systems for measuring contemporaneously several dimensions of or for measuring large objects.

The advantages of automatic determination of one or more dimensions of parts at an inspection position are well known, and to achieve those advantages various systems have been designed to inspect parts whose general shape and size are predetermined, the parts typically being mass-produced items. Noncontact systems based on optical scanning, for example, have been used to determine certain dimensions and are particularly useful for measuring small parts automatically. In one typical optical systems, a production item or workpiece is positioned within the field of view of an optical scanner which cooperates with a programmed processor to take sequentially any of a variety of measurements on the part. One limitation of such a system is the inspection and accurate measurement of large objects. The drift of the optical scanner over a small range is within acceptable limits, but when viewing a large object, the effect of drift reaches significant proportions. For example, if an optical scanner with a 1% drift were scanning an object having a 3 inch diameter, the 30 mils uncertainty of the measured dimension is unacceptably large.

A further problem faced by optical scanning measurement systems is that a large number of measurements must be taken without slowing or interrupting the production rate. One approach of the prior art to the optical measurement of large workpieces uses solid state linear arrays. The workpiece is positioned between a light source and a set of linear arrays, illustratively 2000 in number, each of which is a semiconductor chip having a window measuring approximately one-half mil in width. Each such linear array is coupled to a processor by a signal conditioner. The cost of a first channel is typically from about $3,000 to about $9,000, and although with multiple channels the cost per channel can drop to $1,000 per channel. With ten or more channels, however, the cost is still very high.

In another prior art approach, a laser generated narrow beam is deflected by an object, typically hexagonal in cross section, rotating at a known speed and having mirrored surfaces so that the beam sweeps a large line. The workpiece is positioned between the rotating object and a central optical receptor so that the beam illuminates the central receptor until the workpiece intercepts the beam, whereby the dimensions of the workpiece are ascertained from the "dark" time. The central receptor can be a photodiode or a solar cell, typically. One problem ailing such a system is its lack of versatility.

It is therefore an object of the present invention to overcome the scanner drift problem in an optical electronic measurement system which can measure large workpieces accurately.

It is a further object of the present invention to provide a versatile noncontact measurement system which can make several measurements quickly and at a reasonable cost.

SUMMARY OF THE INVENTION

The foregoing and other objects are achieved by an arrangement wherein an optical scanner has a plurality of fields of view, each including a workpiece edge or other point of interest, in a differential mode and a processor appropriately processes the data.

More specifically, in accordance with the invention, a scanner has several optical inputs provided illustratively by a group of flexible fiber optic bundles. The object ends of the bundles are positioned at known locations with respect to the workpiece to be measured so that each bundle views a respective edge, pairs of which define a measurement to be taken. Preferably, an inspection mount receives and positions workpieces of a known configuration relative to the object ends of the fiber optic bundles.

Prior to use, the measurement system is calibrated by positioning a workpiece of known dimensions in the mount so that various edges thereof are within the fields of view of the fiber optic bundles. The scanner photocathode images the workpiece edges at identifiable locations, and is electronically scanned to determine the location of each edge image relative to scan origins. A processor adjusts functions to relate the locations of correlated edges with the known dimensions.

Subsequently, similar workpieces of unknown dimensions are positioned within the mount. The calibrated system takes the same measurements using the adjusted functions and provides an output representing the unknown dimensions.

For a 1% drift, the maximum uncertainty for two combined fiber optic fields of view, each of which illustratively is 30 mils wide, is 0.6 mils. Accordingly, by virtue of the present invention the uncertainty in an illustrative measurement of a 3 inch diameter object reduces from an unacceptable 30 mils to 0.6 mils.

Moreover, since the invented system views the several independent fields of view of the fiber optic bundles in a single scan, the time needed to measure an item is reduced.

BRIEF DESCRIPTION OF THE DRAWINGS

Further features and advantages of the invention will become apparent from reading the following detailed description when taken in conjunction with the accompanying drawings wherein:

FIG. 6 is a block diagram illustrating the basic components of the scanner of FIG. 1;

FIG. 7 is an illustrative block diagram showing the overall operation of the interface unit of FIG. 1;

FIGS. 8A and 8B are representative views of the scanner photocathode images of the embodiment of FIG. 1 and the binary signals derived from the scanner, and are useful in understanding the present invention;

DESCRIPTION OF A PREFERRED EMBODIMENT

Figure 1:
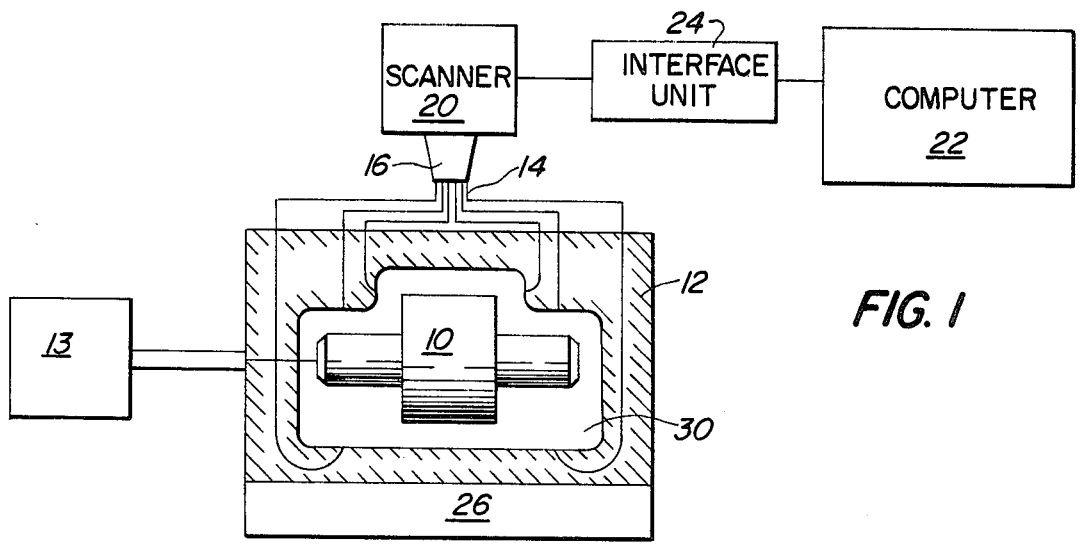
FIG. 1 is an illustrative part schematic view part block diagram of a measurement system according to preferred embodiment of the present invention.

FIG. 1 illustrates a preferred embodiment measurement system according to the present invention. A workpiece 10 is shown, and illustratively is a rotor for a generator. Such a rotor 10 may be mass produced and may have a variety of measurements to be taken on its various parts. Such measurments might include various diameters, concentricity, length, straightness, whip, tool chatter and TIR (Total Indicator Reading), among others. Workpiece 10 is shown positioned in a mount 12 which holds the object ends of a plurality of flexible, coherent fiber optic bundles 14 in fixed positions. A coupler 16 connects the other ends of bundles 14 to an optical scanner 20 which is controlled by a computer 22 via an interface unit 24. A light source 26 illuminates the workpiece 10, and images of the fields of view of all bundles 14 are formed at discrete locations on the photocathode of scanner 20.

Figure 2:
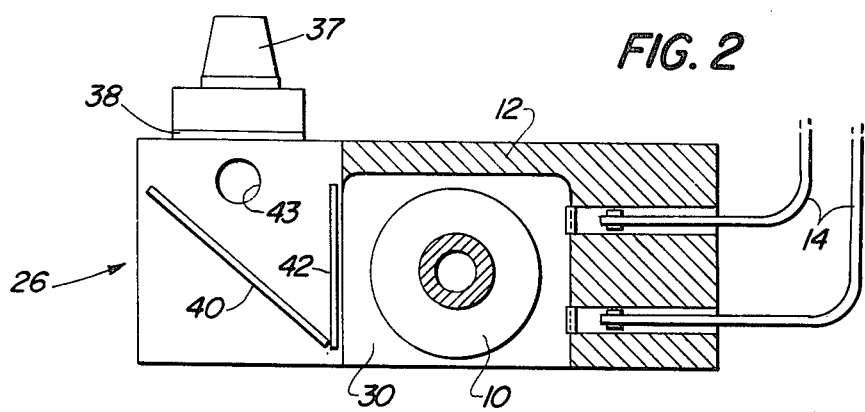
FIG. 2 shows a representative side view of the workpiece mount of FIG. 1 and shows more clearly the lighting system of the embodiment of FIG. 1.
Figures 3A, 3B:
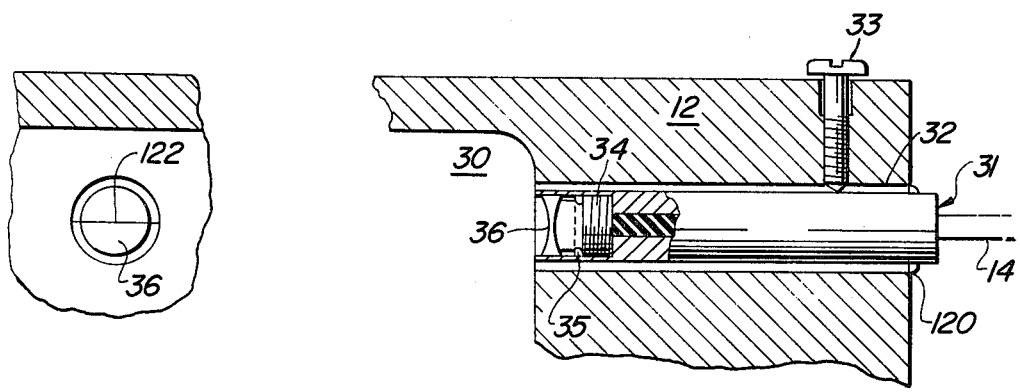
FIG. 3A is an expanded side view with parts broken away of a fiber optic bundle end fitting used to connect a bundle to the workpiece mount and FIG. 3B is a plan view of such end fitting.

Mount 12 is designed to accommodate the workpiece 10 and to position the imaging or object ends of bundles 14 in predetermined relationships therewith to view the workpiece edges from which measurements are to be taken. In this illustrative embodiment, mount 12 may be formed of Class 40 annealed cast iron, such as Meehanite, in order to fix the bundle positions accurately and provide an effective secondary standard. It will be understood, however, that other stable substances such as granite slab may be used within the scope of the present invention. Mount 12 of the illustrated embodiment engages workpiece 10 rotatably so that it can be rotated by a motive source 13 to allow measurements such as TIR to be taken over the 360° circumference of the workpiece. Referring more particularly to FIGS. 2 and 3A, mount 12 includes a chamber 30 which positions workpiece 10. The object end of each bundle 14 is adjustably positioned with respect to the chamber 30 by a cylindrical end fitting 31 slidably engaging a corresponding aperture 32 in mount 12 but held in position by a set screw 33. Fitting 31 is hollow and threaded to adjustably engage a correspondingly threaded ferrule 34 affixed to bundle 14. A spring clip 35 inside fitting 31 also engages the ferrule 34. Each fitting 31 also includes a lens 36 at a fixed location to focus and magnify, if appropriately adjusted, the image of a portion of workpiece 10 at the object end of bundle 14. It will be understood that a variety of other arrangements can be used to couple the bundles to the mount, and that the foregoing mode is to be taken as illustrative rather than limitive.

Light source 26 includes a quartz lamp 37. The light passes through a heat resistant glass 38, is reflected by a mirror 40, and passes through an opal glass 42 to illuminate workpiece 10. Blower holes 43 permit ventilation for the light source. It will be understood, however, that so long as the workpiece is well illuminated, no particular light source need be specified. Incident light can suffice, or a variety of lambertian or collimated or other light sources can be used with the present invention.

Fiber optic bundles 14 are flexible and can be up to several feet long. Each bundle comprises a large number of individual fibers which are generally circular in cross section, with a diameter of about 0.5 mils per fiber. In the illustrated embodiment, each bundle 14 has a diameter of about four millimeters. The bundles are coherent so that images are transmitted without deformation.

Figure 4:
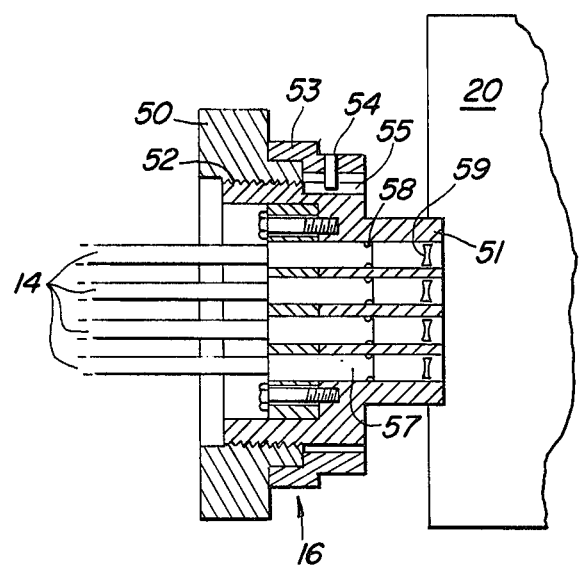
FIG. 4 is a side view with parts broken away of a coupler which connects fiber optic bundles to the scanner.
Figure 5:
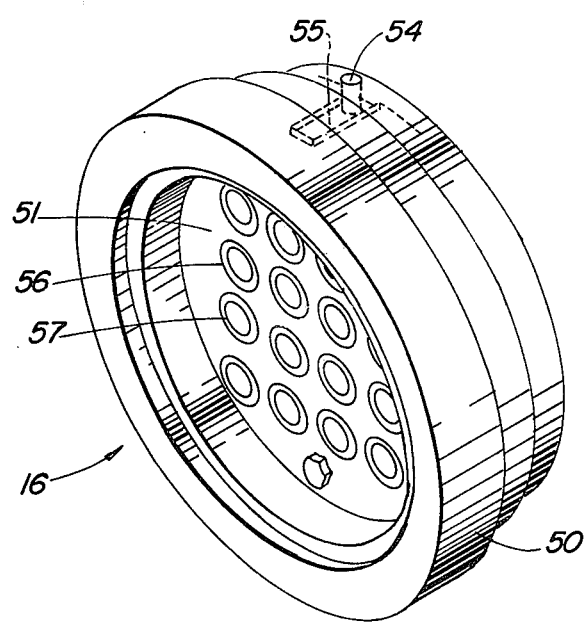
FIG. 5 is perspective view of the coupler of FIG. 4.

While mount 12 in cooperation with end fitting 31 positions the object ends of bundles 14 with respect to the workpiece, the other ends of bundles 14 are positioned with respect to scanner 20 to image at known locations on the imaging plane of the photocathode. This is achieved by a coupler 16 shown in FIGS. 4 and 5 which is similar in its focusing operation to a camera lens assembly. Coupler 16 engages scanner 20 by any convenient means (not shown) such as a bayonet fitting or spring clip arrangement for example. Coupler 16 includes two relatively movable members: an outer rotatable ring 50 and an inner axially movable member 51. Ring 50 and member 51 are mutually engaged by threads 52 therebetween. Member 50 engages a free fit non-rotating member 53 which has a radially inward extending pin 54. Pin 54 slidably engages axial slot 55 machined onto the outside of member 51. Thus, when ring 50 is rotated, pin 54 cooperates with slot 55 and the free fit engagement of ring 50 to member 53 so that member 51 moves axially. Member 51 includes a plurality of apertures 56 parallel to the axis of the field of view of scanner 20. Apertures 56 extend through member 51 and are equal in number to the number of bundles 14 used in the specific application. (In the illustrated embodiment, sixteen bundles are used, but it will be understood that as many bundles may be used as are necessary for any given application.) Apertures 56 engages end fittings 57 similar to end fittings 31. Each fitting 57 includes a fastener, such as a spring clip 58, and a lens 59 set (in a manner described infra) to focus the image carried by respective bundle 14 on the photocathode of scanner 20. Any focusing variations in the distance from the photocathode to coupler 16 caused by substituting tubes or entire scanners are compensated for by rotating ring 50.

The preferred scanner 20 is the model 658A Optical Data Digitizer manufactured by EMR-Photoelectric Division of Sangamo Weston, Inc., at Princeton, N.J. The model 658A incorporates an image dissector tube and has a large circular input image format about forty millimeters in diameter which allows up to at least fifty bundles to be used. An image focused on the photocathode of the tube causes it to emit an identical electron image. The electron image is focused at a plane containing a small aperture at the entrance to a multistage electron multiplier. The electron image is scanned, illustratively by discrete amounts such as 0.1 mil increments, past the aperture by a magnetic or electrostatic field, and the image is thereby "dissected." Electrons entering the aperture multiply by secondary emission in the electron multiplier to bring the signal current to a usable level. The model 658A scanner provides real time random axis scanning so that any point in the field of view of the image dissector tube may be accessed at any time. The scanner forms the binary equivalent of the quantized intensity values of points on the field of scan, and provides a signal component representing the brightness at each scanned point. It will be understood that other types of scanners, such as a vidicon, can be used instead of the image dissector of the embodiment described herein. The vidicon-type scanner includes an integrating sensor which stores input luminous flux, and the target image is scanned with an electron beam. However, more complex peripheral support is required to practice the present invention with a vidicon tube.

Referring to FIGS. 6 and 7, the image dissector 20 receives a request for data at an X and Y position from the computer through interface unit 24. The request is applied to a scanning decoder 60 which supplies the data to a scanning driver 62. Scanning driver 62 applies a signal to the tube 64 so that the electron image is moved to allow the particular X and Y portion thereof to pass through the tube aperture. Tube 64 applies a signal to an intensity detector 66 which couples the signal to an intensity encoder 68 which supplies the intensity information for the point X, Y to the computer interface unit 24 which, in turn, supplies the requested data to computer 22.

FIGS. 8A and 8B are useful in understanding the operation of optical scanner 20. FIG. 8A shows a photocathode image 70 which includes at discrete positions all images 72 transmitted by bundles 14. Each image 72 comprises a light portion and a dark portion separated by an edge image 74 corresponding to an edge of workpiece 10. As shown in FIG. 8A, edges 74 may be randomly oriented. Preferably, though, a physical adjustment (described infra) is made so that all edges 74 are vertical with the light portion being to the left, as shown in the bottom four images 72 of FIG. 8A. (Alternatively, computer 22 can execute a rotation of each image 72 mathematically so that all edges 74 are uniformly oriented in effect. However, this involves more complex software.) The photocathode generates a corresponding electron image which is scanned past an aperture, as mentioned above. Arrows 76 show the direction and position relative to images 74 of the scan, and preferably the scan direction is perpendicular to vertical edges 74, as shown at 76d.

Preferably, random access scanner 20 does not scan continuously across each of 256 horizontal lines. It is not necessary to scan between images 72, and computer 22 causes scanner 20 to scan discontinuously for greater efficiency. Computer 22 is programmed with the location of each field 72 relative to image 70 and causes a left to right scan, illustratively, of one image 72. Scanner 20 outputs a binary zero for scanned positions with intensity below a threshold level and a binary positive signal for scanned positions where the intensity exceeds the threshold level. The scan across the first image 72 continues until the binary signal changes, indicating a transition of light to dark, i.e., an edge 74.

In scanning an image 72, the left-to-right scan proceeds incrementally, and adjacent scan positions on the photocathode are separated by a known distance, illustratively 0.1 mil. The number of increments from the beginning of scan of each image 72 to its respective edge image 74 is registered by computer 22 which then directs the scan to jump to the left-most position (origin) of a different image 72. This is illustrated in FIG. 8B which shows the scan of the bottom four images 72 of FIG. 8A. The dotted lines 78 indicate that the scan is jumping to the next image 72, while solid lines 80 indicate the binary signal generated during a scan. It will be understood that because scanner 20 is preferably random access, images 72 can be scanned in any sequence, and scanning is continued until the positions of all edges images 74 are known. With the positions of edge images 74 the various desired dimensions may be arithmetically calculated.

Set-up, Calibration and Operation

The relative positions of the lenses, workpiece, fiber optic bundle object ends and photocathode must cooperate so that all images of the workpiece portions are focused on the photocathode with uniform magnification. The following adjustment procedure has been found suitable, although others may occur to those in the art.

Figure 9:
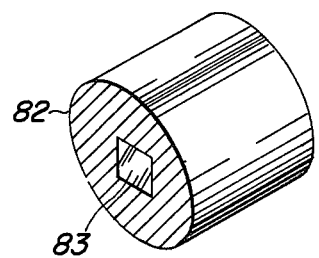
FIG. 9 is a diagram of a mask used in an illustrative set-up procedure for the system.

The adjustment at the scanner end can be done with an opaque mask 82 with a transparent window 83 of known dimensions (FIG. 9) which is placed sequentially over the object end of each bundle 14 so that window 83 registers against the bundle end. Scanner 20 is set to give a video signal and is coupled to a video monitor. The positions of each end fitting 57 (and correspondingly lens 59) relative to coupler 16 and of bundle 14 relative to lens 59 are adjusted so that the monitor shows a clear image with a magnification factor of 1× for each bundle. The focusing can be checked precisely by coupling the scanner 20 output to an oscilloscope giving an "A-trace," that is, tracing a horizontal line indicating scan position with vertical excursions in proportion to intensity changes. Scanner 20 is caused to scan one line across the photocathode which intercepts the image of window 83. If the corresponding lens 59 is focused, the "A-trace" will show sharp peaks at the window edges.

Next an adjustment is made at the workpiece mount in a similar manner, but focusing each bundle 14 (after placement in its respective fitting 31) on a calibration piece having a marking of known dimensions rather than on window 83. If desired the orientation can be set so that lens 36 imparts a magnification factor to each image for higher precision measurements.

The next physical adjustment is made so that each image 72 has its light portion to the left, illustratively, and so that each edge 74 is vertical, preferably. The first condition can be met simply by putting a workpiece in mount 12, applying the scanner 20 output to a video monitor and rotating each fitting 31 until the light portion is seen to be to the left of the dark portion for that respective bundle.

Figure 10:
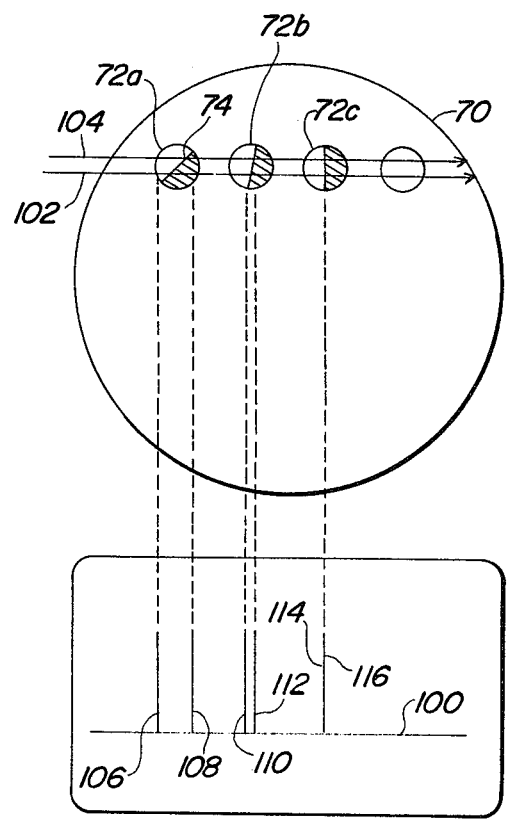
FIG. 10 is an illustrative diagram useful in understanding one set-up procedure for rotationally orienting the fiber optic bundles with respect to the workpiece edges.

To vertically orient edges 74, the scanner 20 output is applied to an oscilloscope giving an "A-trace," illustrated in FIG. 10, which shows a horizontal line 100 indicating scan position and vertical lines thereon at positions corresponding to intensity changes (edges 74). The scanner is caused to scan horizontally across each image 72 at each of two vertically separated positions 102 and 104 with both scans traced in superposition on the oscilloscope. Referring to the left-most image 72a, scan line 102 intercepts the non-vertical edge 74 at one position to generate a vertical line 106 on the oscilloscope display, whereas scan line 104 intercepts that edge 74 at a second position to generate a vertical line 108 displaced a distance from line 106. Referring to image 72b, it will be seen that edge 74 is closer to vertical and that the corresponding lines 110, 112 are closer together. In image 72c the edge 74 is perfectly vertical and corresponding lines 114, 116 coincide.

Thus, with a workpiece positioned in mount 12, each end fitting 31 is rotated until the oscilloscope "A-trace" for the corresponding image 72 shows a single line, as described above with respect to image 72c. The properly oriented end fitting 31 is then locked into position by epoxy cement 120 (FIG. 3A). Alternatively, a line 122 (FIG. 3B) may be scribed onto (or any other suitable marking may be made on) a visible part of fitting 31 so that it can be easily reset if it should rotate or if the rotational orientation of workpiece edges should change.

The system is then ready for calibration; a workpiece 10 of known dimensions is positioned in mount 12, and computer 22 causes a scan (of four discontinuous lines, as described supra) to be made and receives data indicating edge image positions. Such data gives the number of increments from a scan origin for each image field 72 to the respective edge 74. The computer 22 is programmed to correlate various images 72, illustratively by scanning sequentially correlated pairs of images 72 or by correlating data for images 72 scanned out of correlation order. For each measurement between two edges a constant CONST is generated so that $$D_k = CAL1 + CAL2 + CONST$$

where $D_k$ is the known dimension and CAL 1 and CAL 2 are the number of increments (of known spacing) from the respective origin to the two edge images 74 corresponding to the measurement.

The following equation then relates the same measurement $D_x$ on a subsequent part of unknown size to the number of increments MEAS 1 and MEAS 2 to the two corresponding edges 74:

$$D_x = CAL1 - MEAS1 + CAL2 - MEAS2 + CONST.$$

The measurement $D_x$ can then be displayed, printed or stored, as desired, on suitable means. If desired, a tolerance calculation can be done to determine whether various measurements deviate excessively from predetermined values.

Rotational measurements such as TIR can be made using rotational motive means 13 which rotates workpiece 10 about its center in mount 12. One or more images 72 are scanned at times corresponding to various rotational orientations of workpiece 10 to locate the corresponding edge image 74. The movement of such edge images 74 is related to such desired rotational measurements.

It will be appreciated that if the subsequent part is positioned in mount 12 but offset (due to wear in the rest points, for instance), the edges will be displaced relative to images 72, but the change will not cause an error. This is because if the workpiece is moved so that MEAS 1 increases, then MEAS 2 decreases by an equal amount, and vice-versa. Thus, the positioning or parts within or upon a mount is not critical when all fields 72 are uniformly oriented with light images portions to one side and dark portions to the other side, so long as the edges of interest of the part are within the fields of view of the fiber optic bundles 14. This is a valuable advantage over mechanical systems where the wear in the rest points caused by repetitive positioning and removal of workpieces within the mount soon deteriorates the measurement accuracy.

The invented system is also extremely versatile and can accommodate extremely large parts since the flexible fiber optic bundles can be several feet long. As mentioned earlier, prior art systems have been unable to measure very accurately such large parts except at great expense.

Another important advantage of the present system is that it is less expensive than alternative devices for multiple measurements.

Another very important advantage is that the system can be retained or recalibrated as frequently as one wishes, simply by inserting the workpiece of known size into the mount and calculating new constants. Thus, the accuracy of the machine can be updated daily, if desired.

While the invention has been described with reference to a particular embodiment, those skilled in the art will appreciate that various modifications can be made. For example, means other than flexible fiber optic bundles could provide inputs to a scanner. Further, as mentioned supra, a vidicon scanner could be used. Other arrangements to orient the fiber optic bundles (or other input devices) relative to the workpiece can be used. Other machine implemented methods for calibration or for relating edge image positions to dimensions can be devised. Such modifications, and others, are within the scope of the present invention.

I claim:

1. An optoelectronic system for simultaneously measuring dimensions in at least two planes of a three dimensional workpiece comprising:
    a mount for receiving and orienting said workpiece;
    a plurality of fiber optic bundles each having an object end positioned proximate to selected areas of said workpiece, said object ends of said bundles being held in a fixed position relative to each other in said mount, wherein each fiber optic bundle forms a separate image of a selected edge of said workpiece;
    a scanner having a light sensitive photocathode optically coupled to receive the plurality of separate images formed by said fiber optic bundles, said bundles forming a collective image of said separate workpiece edge images in a fixed position on the photocathode of said scanner, said scanner being arranged to scan only those areas of said photocathode upon which said collective image is formed and to generate electrical signals corresponding to detected positions of said images of said workpiece edges; and
    a processor receiving said electrical signals for determining selected measurements of said workpiece from said detected positions of the images of said workpiece edges.

2. The system according to claim 1 wherein said processor includes means for correlating each field of view of a respective fiber optic bundle with a respective measurement to be taken.

3. The system according to claim 1 wherein said scanner generates electrical signals indicating positions, relative to a scan origin, of said images of edges of said workpiece from which measurements are to be taken, and wherein said processor correlates said edge image position indicating signals to the distance between said edges.

4. The system according to claim 3 wherein said processor includes means for receiving known measurements of a standard workpiece and generates a function to correlate the electrical signals generated by said scanner with said known measurements when said standard workpiece is measured by said system.

5. The system according to claim 3 wherein said workpiece edge images corresponding to a measurement to be taken and transmitted to said scanner are uniformly oriented with respect to the position of a light portion thereof relative to a dark portion thereof.

6. The system according to claim 3 or 5 wherein said edge images are perpendicular to the direction of lines of scan of said scanner.

7. The system of claim 6 wherein said scanner scans across the photocathode areas corresponding to each field of view of a respective fiber optic bundle at substantially a diameter thereof.

8. The system according to claim 1 further including means cooperating with said mount for rotatably engaging and rotating said workpiece in said mount.

9. The system of claim 1 further including:
a lens associated with the object end and the photocathode end of each fiber optic bundle;
means, disposed in said workpiece mount and engaging the lens associated with the object end of each said bundle, for focusing said object end lens on a workpiece edge to be imaged, each said means further being rotationally adjustable about its optical axis to orient each said bundle rotationally with respect to said workpiece edge; and
a coupler mounted to said photocathode for receiving each of said photocathode end lenses whereby said workpiece edge images are focused in fixed positions on said photocathode.

10. A process for simultaneously making measurements of dimensions in at least two planes of a three dimensional workpiece comprising the steps of:
forming a first plurality of images from a plurality of fixed imaging positions, each said image corresponding to an edge of a standard workpiece with known dimensions in an inspection field;
optically coupling said first plurality of images to the photocathode of a scanning-type imaging device to form a collective image having each one of said first plurality of images at a fixed position within said collective area image;
scanning said collective image at each of said fixed positions;
generating first electrical signals corresponding to detected image intensity at each of said scanned positions on said collective image;
correlating said first electrical signals to said edge images;
adjusting functions to relate mathematically said edge-representing signals to said known dimensions;
forming a second plurality of images from said plurality of fixed imaging positions each said image corresponding to an edge of a subsequent workpiece of unknown dimensions;
optically coupling said second plurality of images to an imaging device to form a second collective image having each one of said second plurality of images at said fixed positions within said collective image;
scanning said second collective image at each of said fixed positions;
generating second electrical signals corresponding to detected image intensity at said scanned positions on said collective image;
correlating said second electrical signals to said second edge images; and
applying said adjusted functions to said signals corresponding to said second edge images to calculate said unknown dimensions.

11. A method of simultaneously measuring dimensions in at least two planes of a three-dimensional workpiece comprising the steps of:
forming a plurality of images from a plurality of fixed imaging positions, each said image including an edge of said workpiece from which a measurement is to be taken;
optically coupling said plurality of images to the photocathode of a scanning-type imaging device to form a collective image of said plurality of images at fixed positions on said photocathode;
scanning said collective image at each of said fixed positions;
generating signals corresponding to detected image intensity at each of said scanned positions of said collective image; and
processing selected ones of said signals to determine the positions of selected ones of said imaged workpiece edges and to calculate selected measurements of said workpiece therefrom.

12. The method of claim 11 wherein said forming a plurality of images step includes relatively positioning said workpiece and a plurality of image transmitting optical devices.

13. The method of claim 11 wherein said scanning step includes scanning until an edge-representing image is located in one image portion and directly proceeding to scan another image portion.

14. The method of claim 11 wherein said processing includes determining the locations of selected edge images relative to said collective image and applying a function of said locations to correlate said edge images prior to making said measurement calculation.

* * * * *